Mar. 27, 1923.
H. D. FORSE.
THROTTLE PEDAL FOR MOTOR VEHICLES.
FILED DEC. 5, 1921.
1,449,390
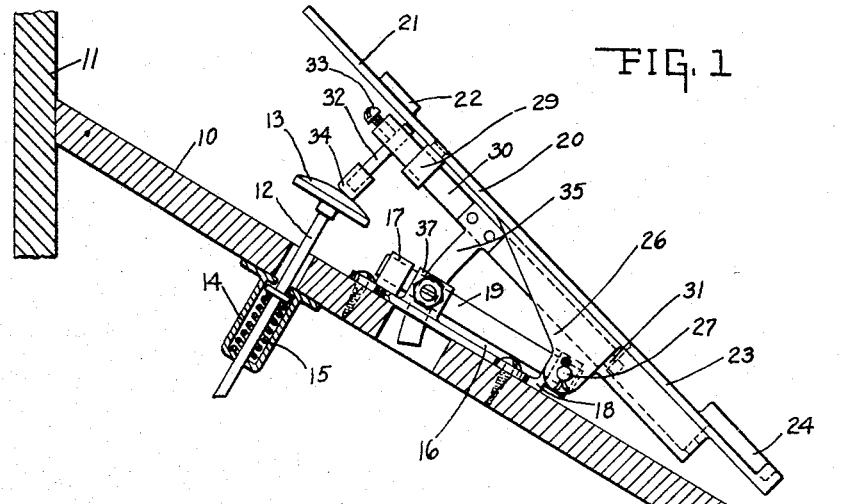
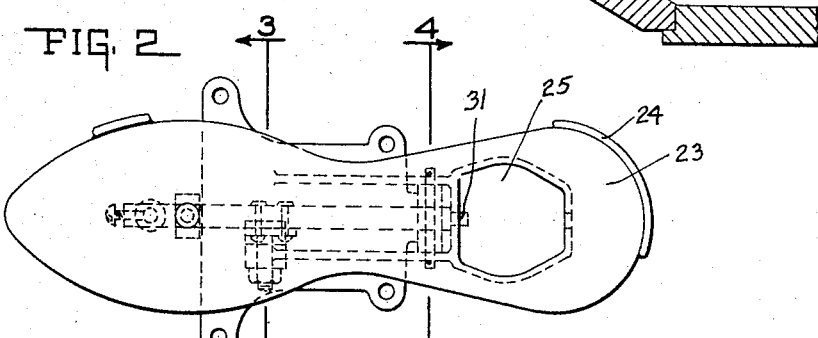
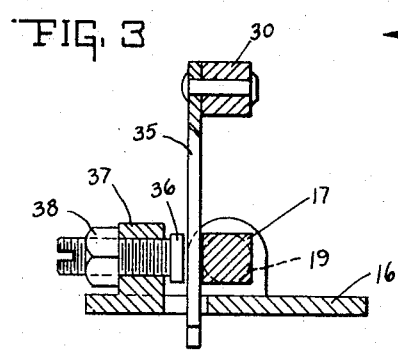
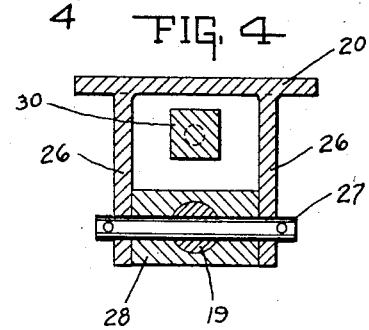
INVENTOR.
HARRY DONALD FORSE.
BY
ATTORNEYS.

Patented Mar. 27, 1923.

1,449,390

UNITED STATES PATENT OFFICE.

HARRY DONALD FORSE, OF ANDERSON, INDIANA.

THROTTLE PEDAL FOR MOTOR VEHICLES.

Application filed December 5, 1921. Serial No. 519,960.

*To all whom it may concern:*

Be it known that I, HARRY DONALD FORSE, a citizen of the United States, and a resident of Anderson, county of Madison, and State of Indiana, have invented a certain new and useful Throttle Pedal for Motor Vehicles; and I do hereby declare that the following is a full, clear, and exact description thereof, reference being had to the accompanying drawings, in which like numerals refer to like parts.

This invention relates to a foot rest or pedal for use in connection with the throttle of a motor driven vehicle for enabling the operator thereof to control the foot throttle with a minimum effort and strain and control the operation of the motor more evenly, smoothly and with less effort than is possible with the constructions now in use.

The principal feature of the invention resides in the means for locking the pedal and foot throttle in a given position by exerting a slight side pressure thereon.

The full nature of this invention will be understood from the accompanying drawings and the following description and claims.

In the drawings Fig. 1 is a side elevation of the foot pedal and throttle mounted upon the floor board of a vehicle shown in cross section. Fig. 2 is a plan view looking down upon the foot pedal. Fig. 3 is a section taken on the line 3—3 of Fig. 2. Fig. 4 is a section taken on the line 4—4 of Fig. 2.

In the drawings there is shown that portion of a vehicle comprising the foot board 10, dash board 11, foot throttle push rod 12 and mushroom top 13. The push rod 12 extends through a suitable opening in the foot board 10 and a depending spring housing 14 which is rigidly secured to the under part of said foot board. Contained in said housing there is a spring 15 normally maintaining the foot throttle in its upper position, whereby the throttle is closed. For opening the throttle a downward pressure must be exerted upon the mushroom top 13.

Rigidly secured upon the upper side of the foot board there is a base plate 16 having upwardly extending collars 17 and 18 through which a bar 19 extends, loosely mounted therein so as to freely rotate about its center and having its bearings at each end in said collars 17 and 18. Mounted above the base plate 16 there is a foot plate 20 having a toe portion 21 with a side projection 22, and a heel portion 23 having a projecting rim 24 against which the heel rests. Said heel portion also contains a depressed portion 25 into which the heel of a lady's shoe may extend. Said foot plate is provided with downwardly extending ears 26 which are pivotally secured upon one end of the bar 19 by means of the pin 27 extending through said ears and the spacer block 28, whereby said foot plate is fulcrumed upon said pin so as to tilt about the axis thereof. This arrangement provides a universal shaft whereby said foot plate may tilt longitudinally about the axis of the pin 27 for actuating the foot throttle, and may also turn about the axis of the bar 19. It will be understood that the ends of the bar 19 projecting through the collars 17 and 18 are rounded so as to turn therein, while the intermediate portion thereof is rectangular in cross section, as shown in Fig. 4.

Suspended from the underneath part of the plate 20 and rigidly secured thereto there is a collar 29 through which extends a bar 30 having a reduced end 31 adapted to extend into a suitable opening in the heel portion 25, whereby said foot plate may turn about the axis thereof. At the forward end of said bar and extending therein there is a presser rod 32 adjustably mounted in said bar and secured in adjusted position by the set screw 33. The lower end of said rod is provided with a cap 34 of rubber or a similar resilient material. The presser rod 32 is so positioned and adjusted as to engage the top surface of the mushroom top of the foot throttle when both throttle and plate 20 are in normal position.

Rigidly secured to the bar 30 there is a downward projecting guide member 35 which is slightly curved and extends downwardly through a suitable opening in the plate 16 between the rectangular portion of the bar 19 and an adjustable friction screw 36, said friction screw being adapted to screw through a lug 37 formed on the base plate and being locked in adjusted position by the lock nut 38. By means of this arrangement when the foot plate 20 is moved sidewise by the operator, the guide 35 is tilted at an angle so as to frictionally engage the head 36 and bar 19 in which position the foot plate 20 will be locked and steadied. After the operator has actuated the throttle so as to give the motor a certain desired speed, by moving his foot to the side, the foot plate is locked in that position and the jars and bumps of the vehicle will not cause any undesired movement thereof and the consequent fluctuation of the throttle.

The invention claimed is:

1. The combination with a foot throttle for a motor vehicle and a floor board, of a throttle actuating foot rest, including a base plate adapted to be secured to said floor board, a universal joint connection between said foot rest and base plate, whereby said foot rest may be tilted longitudinally thereof for actuating said throttle and means for locking said foot rest in fixed position when tilted laterally about said connection.

2. The combination with a foot throttle for a motor vehicle and a floor board, of a throttle actuating foot rest, a base plate adapted to be secured to said floor board, a universal joint connection between said foot rest and base plate, whereby said foot rest may be tilted longitudinally and laterally thereof, and means on said foot rest for locking it in its longitudinally tilted position when tilted laterally.

3. The combination with a foot throttle for a motor vehicle and a floor board, of a throttle actuating foot rest, a base plate adapted to be secured to said floor board, a bar mounted on said base plate and extending longitudinally with said foot rest, means for pivoting said foot rest on said bar for permitting the longitudinal tilting movement thereof, and a guide member extending downwardly from said foot rest in position to be frictionally engaged upon said foot rest being moved laterally about said bar for maintaining it in fixed position.

4. The combination with a foot throttle for a motor vehicle and a floor board, of a throttle actuating foot rest, a base plate adapted to be secured to said floor board, a bar rotatably mounted on said base plate and extending longitudinally with said foot rest for permitting it to be tilted laterally thereof, means for pivoting said foot rest on said bar for permitting the longitudinal tilting movement thereof, a guide member extending downwardly from said foot rest in position to be frictionally engaged upon said foot rest being tilted laterally about said bar, and adjustable means for engaging said guide member and frictionally maintaining said foot rest in fixed position when tilted about the axis of said bar.

5. The combination with a foot throttle for a motor vehicle and a floor board, of a throttle actuating foot rest, a base plate adapted to be secured to said floor board, a bar rotatably mounted on said base plate and extending longitudinally with said foot rest for permitting it to be tilted laterally thereof, a second bar rotatably mounted on said foot plate, means for pivoting said foot rest on said first mentioned bar for permitting the longitudinal tilting movement thereof, a guide member extending downwardly from said second mentioned bar in position to be frictionally engaged upon said foot rest being turned laterally about said first mentioned bar, and a presser rod secured in said second mentioned bar and extending parallel with said guide member in position to engage and actuate said foot throttle.

6. The combination with a foot throttle for a motor vehicle and a floor board, of a throttle actuating foot rest, a base plate adapted to be secured to said floor board, a bar rotatably mounted on said base plate and extending longitudinally with said foot rest for permitting it to be tilted laterally thereof, a second bar rotatably mounted on said foot plate, means for pivoting said foot rest on said first mentioned bar for permitting the longitudinal tilting movement thereof, a guide member extending downwardly from said second mentioned bar in position to be frictionally engaged upon said foot rest being turned laterally about said first mentioned bar, a presser rod secured on said second mentioned bar and extending parallel with said guide member in position to engage and actuate said foot throttle, and adjustable means for engaging said guide member and frictionally maintain said foot rest in fixed position when tilted about the axis of said first mentioned bar.

In witness whereof, I have hereunto affixed my signature.

HARRY DONALD FORSE.